US009606623B2

(12) United States Patent
Seok et al.

(10) Patent No.: US 9,606,623 B2
(45) Date of Patent: Mar. 28, 2017

(54) GAZE DETECTING APPARATUS AND METHOD

(71) Applicant: Hyundai Motor Company, Seoul (KR)

(72) Inventors: Dong Hee Seok, Seoul (KR); Seok Beom Lee, Seoul (KR); Yang Shin Kim, Gyeongsangnam-Do (KR)

(73) Assignee: Hyundai Motor Company, Seoul (KR)

( * ) Notice: Subject to any disclaimer, the term of this patent is extended or adjusted under 35 U.S.C. 154(b) by 148 days.

(21) Appl. No.: 14/317,608

(22) Filed: Jun. 27, 2014

(65) Prior Publication Data

US 2015/0138066 A1 May 21, 2015

(30) Foreign Application Priority Data

Nov. 15, 2013 (KR) .................. 10-2013-0138977

(51) Int. Cl.
*G06F 3/01* (2006.01)
*G06K 9/00* (2006.01)

(52) U.S. Cl.
CPC ......... *G06F 3/013* (2013.01); *G06K 9/00597* (2013.01)

(58) Field of Classification Search
CPC ........ G06F 3/013; G06F 3/017; G06F 3/0481; G06F 2203/04806; G06F 3/048; G06K 9/00597; G02B 27/0093; A61B 3/113
USPC ....................................... 382/103
See application file for complete search history.

(56) References Cited

U.S. PATENT DOCUMENTS

| 2008/0137909 | A1 | 6/2008 | Lee et al. | |
|---|---|---|---|---|
| 2009/0304232 | A1* | 12/2009 | Tsukizawa | A61B 3/113 382/103 |
| 2013/0286178 | A1* | 10/2013 | Lewis | A61B 3/113 348/78 |
| 2014/0211995 | A1* | 7/2014 | Model | G06F 3/013 382/103 |

FOREIGN PATENT DOCUMENTS

| JP | 52-30748 B2 | 7/2013 |
|---|---|---|
| KR | 10-2000-0056563 | 9/2000 |
| KR | 10-2001-0107411 | 12/2001 |
| KR | 10-2008-0051664 | 6/2008 |
| KR | 10-2012-0043980 | 5/2012 |

* cited by examiner

*Primary Examiner* — Alexander Eisen
*Assistant Examiner* — Abhishek Sarma
(74) *Attorney, Agent, or Firm* — Mintz Levin Cohn Ferris Glovsky and Popeo, P.C.; Peter F. Corless

(57) ABSTRACT

A gaze detection apparatus and method are provided. The method includes storing, by a controller, a reference gaze, a first reference vector, and a second reference vector. An image is then captured by an imaging device that includes user eyes. In addition, the controller detects central points of a pupil and an eyeball from the captured image and generates a gaze vector for one eyeball and a normal vector of a plane at which three central points are formed, when the three central points are detected. A first rotation angle and a second rotation angle are calculated by comparing the gaze vector and the normal vector, respectively, with the first reference vector and the second reference vector and a mean value thereof is calculated. Further, a gaze is then detected by rotating the reference gaze as much as the mean value.

9 Claims, 6 Drawing Sheets

GAZE DETECTING APPARATUS AND METHOD

CROSS-REFERENCE TO RELATED APPLICATION

This application is based on and claims priority from Korean Patent Application No. 10-2013-0138977, filed on Nov. 15, 2013 in the Korean Intellectual Property Office, the disclosure of which is incorporated herein in its entirety by reference.

BACKGROUND

Field of the Invention

The present disclosure relates to a gaze detecting apparatus and method that detects a user gaze from an image.

Description of the Prior Art

With the development of an electronic technology, the use of various electronic devices has been increased and research into human computer interaction (HCI) has been actively conducted. In particular, various HCI technologies, such as voice recognition and motion recognition, have been used recently. In addition to these technologies, since the HCI using a motion of a user's pupil provides convenience and a high input rate, a technology of operating electronic devices, analyzing a psychological state, or tracking a user's gaze to operate the electronic devices has also been developed.

SUMMARY

The present disclosure provides a gaze detecting apparatus and method that detects a user's gaze with improved reliability even when the required feature points are not detected during a gaze detecting process.

In one aspect of the present disclosure, a gaze detecting apparatus may include: a storage unit (e.g., a memory) configured to store a reference gaze, a first reference vector, and a second reference vector; an imaging device (e.g., a camera, a video camera, etc.) configured to capture an image of a user's eyes; a central point detecting unit configured to detect substantially central points of a pupil and an eyeball from the captured image; a vector generating unit configured to generate a gaze vector for one eyeball and a normal vector of a plane at which three substantially central points are formed, when the three central points are detected; a calculation unit configured to calculate a first rotation angle and a second rotation angle by comparing the gaze vector and the normal vector, respectively, with the first reference vector and the second reference vector and calculate a mean value thereof; and a gaze detecting unit configured to detect a user's gaze by rotating the reference gaze as much as the mean value. The plurality of units and the imaging device may be operated by a controller.

The storage unit may be configured to store first reference vectors for left and right eyes, respectively, and the calculation unit may be configured to calculate the first rotation angle by comparing the gaze vector for one eyeball with the first reference vector of any one of the left and right eyes. The calculation unit may be configured to calculate the first rotation angle and the second rotation angle using an Euler angle based algorithm.

In another aspect of the present disclosure, a gaze detecting method may include: detecting a reference gaze, a first reference vector, and a second reference vector by performing a gaze calibration; detecting substantially central points of a pupil and an eyeball from an image that includes a user's eyes; generating a gaze vector for one eyeball and a normal vector of a plane at which three substantially central points are formed, using the three central points when the three central points are detected; calculating a first rotation angle and a second rotation angle by comparing the gaze vector and the normal vector, respectively, with the first reference vector and the second reference vector; calculating a mean value of the first rotation angle and the second rotation angle; and detecting a user's gaze by rotating the user's gaze as much as the mean value.

In the detection of the first reference vector, the first reference vectors tar left and right eyes may be detected and in the calculation of the first rotation angle, the first rotation angle may be calculated by comparing the gaze vector for one eyeball with the first reference vector of any one of the left and right eyes. In the calculation of the first rotation angle and the second rotation angle, an Euler angle based algorithm may be used.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the comps readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
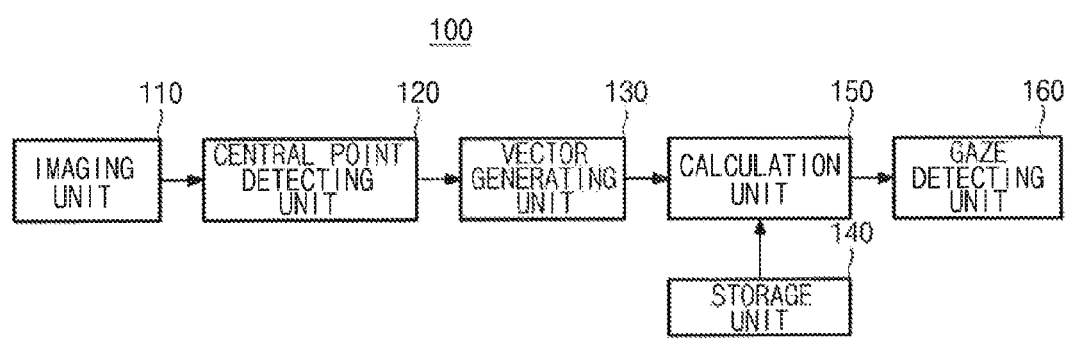
FIG. 1 is an exemplary diagram illustrating a configuration of a gaze detecting apparatus according to an exemplar); embodiment of the present disclosure.

Hereinafter, exemplary embodiments of the present disclosure will be described in detail with reference to the accompanying drawings. FIG. 1 is an exemplary diagram illustrating a configuration of a gaze detecting apparatus according to an exemplary embodiment of the present disclosure. Referring to FIG. 1, a gaze, detecting apparatus 100 may include a plurality of units executed by a controller having a processor and a memory. The plurality of units may include an imaging device 110 (e.g., a camera, a video camera, etc.), a central point detecting unit 120, a vector generating unit 130, a storage unit 140 (e.g., a memory), a calculation unit 150, and a gaze detecting unit 160.

The imaging device 110 may be configured to capture an image of a user's eyes. In other words, the imaging device 110 may be configured to obtain an image that includes the user's eyes by capturing a face region of a user. Accordingly, the imaging device 110 may be implemented as an infrared camera.

The central point detecting unit 120 may be configured to detect substantially central points of a pupil and an eyeball from the image captured by the imaging device 110. The central point detecting unit 120 may be configured to detect the substantially central points of the pupil and the eyeball by processing the captured image. The image captured by the central point detecting unit 120 may be used to detect an eye region and detect the substantially central point of the pupil within the eye region. Further, the central point detecting unit 120 may be configured to detect the substantially central point of the eyeball by detecting portion at which light is reflected from the eyeballs.

Additionally, up to four substantially central points of the pupil and the eyeball may be detected. That is, when the central points of the pupils and the eyeballs of a left eye and a right eye are detected, four central points may be detected. The existing gaze detecting method which detects all the four central points to detect the gaze may not detect the gaze when one of the four central points is not detected. However, the gaze detecting apparatus 100 according to the exemplary embodiment of the present disclosure may detect the user's gaze even when three central points are detected and when four central points are detected. When the gaze detecting apparatus 100 detects all the four central points, the user gaze may be detected by the existing gaze detecting method and when the three central points are detected, the user's gaze may be detected by a method to be described below.

The vector generating unit 130 may be configured to generate two vectors using three central points when the three central points are detected. The vector generating unit 130 may be configured to generate the gaze vector using the central point of the pupil and the central point of the eyeball, for the eyeballs in which the central points of the pupils and the eyeballs are detected. Further, the vector generating unit 130 may be configured to generate a normal vector of a plane at which three central points are formed. The gaze vector and normal vector generating method will be described in detail with reference to FIGS. 2 and 3A-3B.

Figure 2:
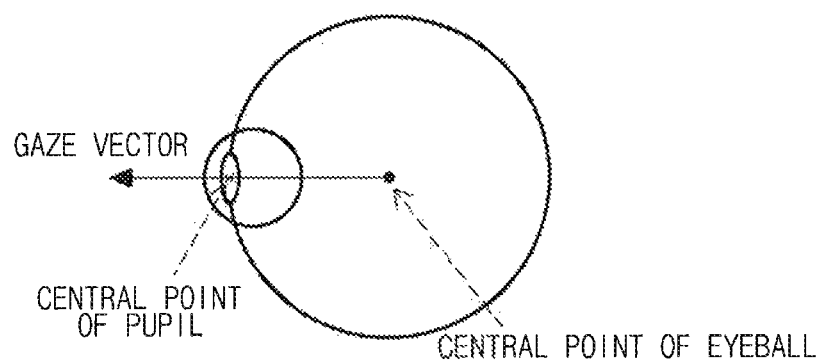
FIG. 2 is an exemplary diagram describing a gaze vector generating process according to an exemplary embodiment of the present disclosure.

FIG. 2 is an exemplary diagram for describing a gaze vector generating process according to an exemplary embodiment of the present invention. Referring to FIG. 2, the central point of the pupil and the central point of the eyeball detected by the central point detecting unit 120 are illustrated. When the three central points are detected by the central point detecting unit 120, the central points of the pupil and the central points of the eyeball for any one of the left and right eyes may be detected. The vector generating unit 130 may be configured to generate the gaze vector toward the central point of the pupil from the central point of the eyeball as illustrated in FIG. 2, for the eyeball in which the central points of the pupil and the central points of the eyeball are detected.

Figure 3A:
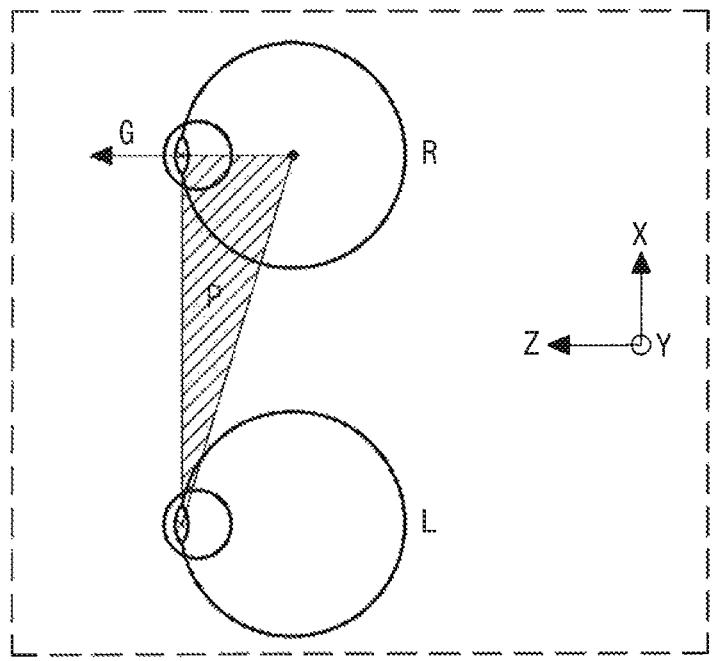
FIGS. 3A-3B are exemplary diagrams describing a gaze vector and nom al vector generating process according to an exemplary embodiment of the present disclosure.
Figure 3B:
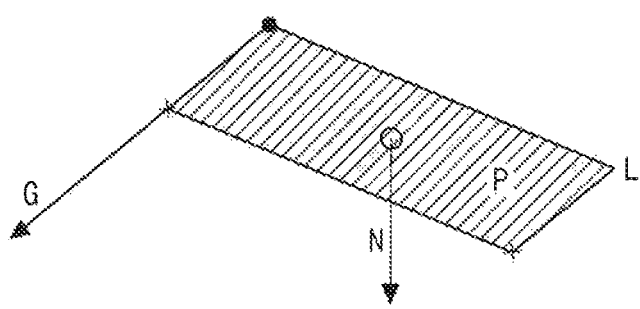

FIGS. 3A-3B are exemplary diagrams describing a gaze vector and normal vector generating process according to an exemplary embodiment of the present disclosure. FIG. 3A is an exemplary diagram schematically illustrating that a user's left eye (L) and right eye (R) is represented by a top-view image. FIG. 3A illustrates an example in which the central point of the pupil and the central point of the eyeball for the user's right eye among the three central points may be detected and the central point of the pupil for the user's left eye may be detected.

The vector generating unit 130 may be configured to generate a gaze vector G by the method described with reference to FIG. 2, for the right eye in which the central points of the pupil and the central points of the eyeball are detected. Further, the vector generating unit 130 may be configured to form one plane P using the detected three central points and generated the normal vector using the formed plane P. FIG. 3B illustrates an exemplary normal vector N that corresponds to the plane formed by the three central points.

The storage unit 140 may be configured to store a reference gaze, a first reference vector, and a second reference vector. The gaze detecting apparatus 100 may be configured to perform a gaze calibration prior to detecting the gaze using the three central points. Further, the reference gaze and the first reference vector may be detected during the gaze calibration process and may be stored in the storage unit 140. The reference gaze may be the user's gaze detected using the four central points during the gaze calibration process. The first reference vector may be the gaze vector generated during the gaze calibration process. In other words, the vector generating unit 130 may be configured to generate the first reference vector using the central point detected during the gaze calibration process. In particular, the vector generating unit 130 may be configured to generate the first reference vectors for each of the left and right eyes. Further, the second reference vector may be a vector in a downward direction, that is, a ground direction. The first reference vector and the second reference vector will be described in detail with reference to FIGS. 4A-4B.

Figure 4A:
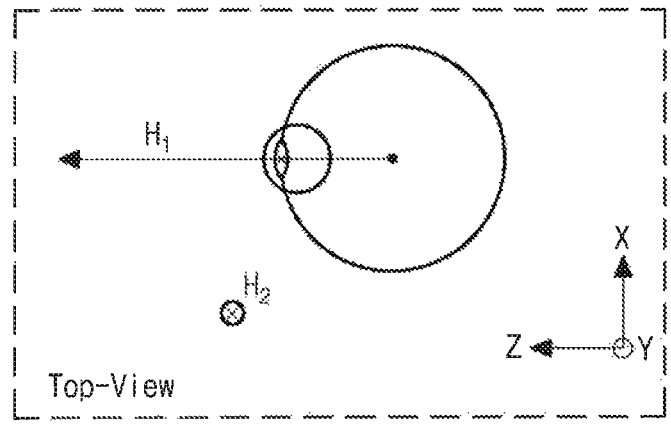
FIGS. 4A-4B are exemplary diagrams describing a reference vector according to an exemplary embodiment of the present disclosure.
Figure 4B:
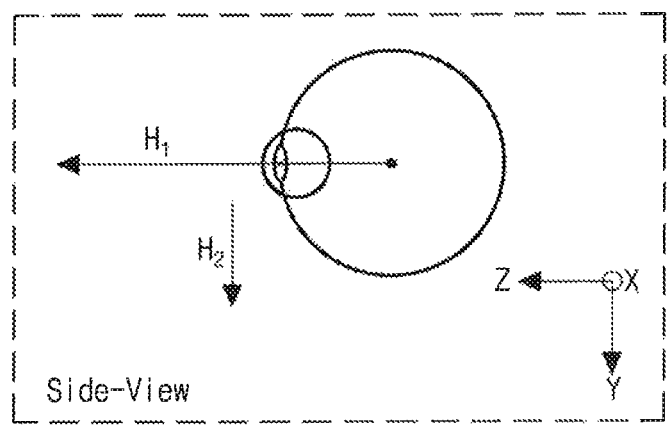

FIGS. 4A-4B are exemplary diagrams describing a reference vector according to exemplary embodiment of the present invention. FIG. 4A is an exemplary diagram schematically illustrating that the first reference vector and the second reference vector may be represented by a top view image and FIG. 4B is an exemplary diagram schematically illustrating that the first reference vector and the second reference vector may be presented by a side-view image.

FIGS. 4A and 4B illustrate a first reference vector H1 toward the central point of the pupil from the central point of the eyeball for the user's eyeballs (e.g., left eye or right eye). Further, a second reference vector H2 directing in a downward (ground) direction is illustrated. When the second reference vector H2 is represented by coordinates of a coordinate system of FIG. 4, the second reference vector H2 may be (0, 1, 0). In other words, the second reference vector may be a fixed vector that constantly directs to the ground. FIG. 4 illustrates the first reference vector for one eyeball, but as described above, the vector generating unit 130 may be configured to generate the first reference vectors for each of the left and right eyes during the gaze calibration process.

The calculation unit 150 may be configured to calculate a first rotation angle by comparing the gaze vector (G of FIG. 3) generated by the vector generating unit 130 with the first reference vector (H1 of FIG. 4) stored in the storage unit 140. Further, the calculation unit 150 may be configured to calculate a second rotation angle by comparing the normal vector (N of FIG. 3) generated by the vector generating unit 130 with the second reference vector (H2 of FIG. 4) stored in the storage unit 140. The process of calculating a rotation angle will be described in detail with reference to FIG. 5.

Figure 5:
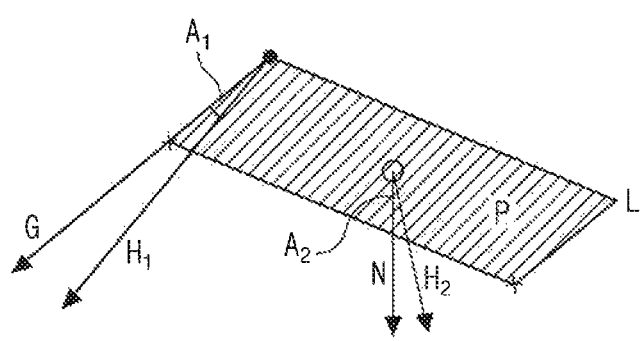
FIG. 5 is an exemplary diagram describing a rotation angle calculating process according to an exemplary embodiment of the present disclosure.

FIG. 5 is an exemplary diagram describing a rotation angle calculating process according to an exemplary embodiment of the present invention. Referring to FIG. 5, when the gaze vector G and the first reference vector H1 are positioned at about the same starting point, an angle difference between the two vectors may be calculated by the first rotation angle. When the calculation unit 150 calculates the first rotation angle, the calculation unit 150 may be configured to compare the gaze vector G with the first reference vector for a left eye when the gaze vector G is a gaze vector for a left eye and compare the gaze vector G with the first reference vector for a right eye when the gate vector G is a gaze vector for a right eye. Further, when the normal vector N and the second reference vector H2 are positioned at about the same starting point, an angle difference between the two vectors may be calculated by a second rotation angle A2. In particular, the first rotation angle A1 and the second rotation angle A2 may be detected by comparing the gaze vector G with the normal vector N, based on the first reference vector H1 and the second reference vector H2.

The first rotation angle and the second rotation angle may be calculated using an Euler angle based algorithm. The Euler angle corresponds when a three-dimensional rotation of the coordinate system is represented by three one-dimensional rotation angles, that is, a rotation angle based on a z axis as a rotation axis, a rotation angle based on a rotating x axis as the rotation axis, and a rotation angle based on a z axis rotating again as the rotation axis. The calculation unit 150 may be configured to calculate a mean value of a first rotation angle and a second rotation angle when the first rotation angle and the second rotation angle are calculated. The mean value may be obtained using various methods for calculating a mean value, such as an arithmetic mean, a geometric mean, and a harmonic mean.

The gaze detecting unit 160 may be configured to detect the reference gaze stored in the storage unit 140 and the user's gaze using the mean value of the rotation angles calculated by the calculation unit 150. In particular, the gaze detecting unit 160 may be configured to detect the user's gaze by rotating the reference gaze stored in the storage unit 140 as much as the mean value calculated by the calculation unit 150. Therefore, the gaze detecting apparatus 100 may be configured to detect the user's gaze even when the three central points are detected during the gaze detecting process and obtain the more reliable gaze data using the previously detected reference gaze and reference vector.

Figure 6:
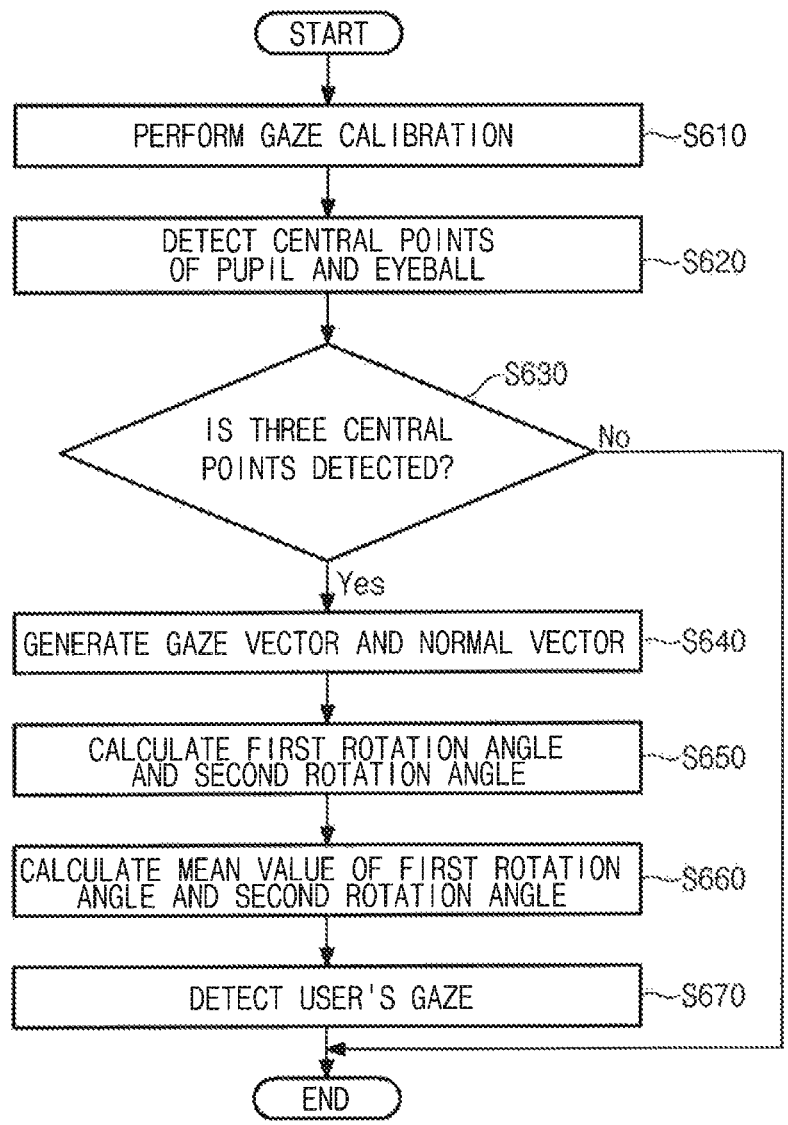
FIG. 6 is an exemplary flow chart describing a gaze detecting method according to an exemplary embodiment of the present disclosure.

FIG. 6 is an exemplary flow chart describing a gaze detecting method according to an exemplary embodiment of the present invention. Referring to FIG. 6, the gaze detecting apparatus 100 may be configured to perform the gaze calibration (S610). In particular, the reference gaze, the first reference vector, and the second reference vector may be detected by performing the gaze calibration. The reference gaze may be the user's gaze detected using the four central points during the gaze calibration process. Further, the first reference vector may be the gaze vector generated during the gaze calibration process. The first reference vectors for the left and right eyes may be detected. The second reference vector may be a vector in the downward direction, that is, the ground direction and may be a preset vector independent of the gaze calibration. The first reference vector and the second reference vector have been described with reference to FIG. 4 and therefore the detailed description thereof will be omitted.

Moreover, the substantially central points of the pupil and the eyeball may be detected from the image that includes the user's eyes (S620). Further, the method may include determining, by the controller, that the three central points are detected (S630). When the three central points are not detected (S630-N), the process may terminate. In particular, when the central points which are equal to or less than two are detected, and in response to determining that the gaze detection is not performed, the gaze detecting process may terminate and when four central points are detected, the existing gaze detecting process may perform the gaze detection and then may terminate.

When the three central points are detected (S630-Y), the gaze vector and the normal vector may be generated using the three central points (S640). In particular, the gaze vector for one eyeball and the normal vector of the plane at which the three central points are formed may be detected using the three central points. This is described with reference to FIG. 3 and therefore the detailed description thereof will be omitted. Next, the first rotation angle and the second rotation angle may be calculated (S650). The first rotation angle and the second rotation angle may be calculated by comparing the gaze vector and the normal vector, which are generated in S640, with the first reference vector and the second reference vector.

In particular, the first rotation angle and the second rotation angle may be calculated using the Euler angle based algorithm. The process of calculating a rotation angle is described with reference to FIG. 5 and the detailed description thereof will be omitted. The mean value of the first rotation angle and the second rotation angle may be calculated when the first rotation angle and the second rotation angle are calculated (S660). Further, the user's gaze may be detected using the calculated mean value and the reference gaze (S670). The user's gaze may be detected by rotating the reference gaze as much as the mean value.

According to the exemplary embodiments of the present disclosure, it may be possible to detect the user's gaze even when three central points are detected during the gaze detecting process and obtain the more reliable gaze data by using the previously detected reference gaze and reference vector.

What is claimed is:

1. A gaze detecting apparatus, comprising:
a memory configured to store program instructions; and
a processor configured to execute the program instructions, the program instructions when executed configured to:
  detect a reference gaze, a first reference vector, and a second reference vector by performing a gaze calibration for a user, wherein the second reference vector is a fixed vector that directs to ground;
  capture an image including user's eyes;
  detect substantially central points of a pupil and an eyeball from the captured image, wherein the processor detects three central points among central points of the pupil and the eyeball for a left eye and a right eye;
  generate a normal vector that corresponds to a plane formed by the three central points and a gaze vector using central points of the pupil and the eyeball of the left eye or the right eye among the three central points;
  calculate a first rotation angle and a second rotation angle by comparing the gaze vector and the normal vector, respectively, with the first reference vector and the second reference vector and calculate a mean value thereof; and
  detect a gaze by rotating the reference gaze as much as the mean value.

2. The gaze detecting apparatus according to claim 1, wherein the program instructions when executed are further configured to:
  store first reference vectors for left and right eyes, respectively; and
  calculate the first rotation angle by comparing the gaze vector for the left eye or the right eye of the user with the first reference vector of any one of the left and right eyes.

3. The gaze detecting apparatus according to claim 1, wherein the program instructions when executed are further configured to calculate the first rotation angle and the second rotation angle using an Euler angle based algorithm.

4. A gaze detecting method, comprising:
  detecting, by a controller, a reference gaze, a first reference vector, and a second reference vector by performing a gaze calibration for a user, wherein the second reference vector is a fixed vector that directs to ground;
  detecting, by the controller, substantially central points of a pupil and an eyeball from an image that includes user eyes, wherein the controller detects three central points among central points of the pupil and the eyeball for a left eye and a right eye;
  generating, by the controller, a normal vector that corresponds to a plane formed by the three central points and a gaze vector using central points of the pupil and the eyeball of the left eye or the right eye among the three central points;
  calculating, by the controller, a first rotation angle and a second rotation angle by comparing the gaze vector and the normal vector, respectively, with the first reference vector and the second reference vector;
  calculating, by the controller, a mean value of the first rotation angle and the second rotation angle; and
  detecting, by the controller, a gaze by rotating the reference gaze as much as the mean value.

5. The gaze detecting method according to claim 4, wherein in the detection of the first reference vector, the first reference vectors for left and right eyes are detected, and
  in the calculation of the first rotation angle, the first rotation angle is calculated by comparing the gaze vector for the left eye or the right eye of the user with the first reference vector of any one of the left and right eyes.

6. The gaze detecting method according to claim 4, wherein in the calculation of the first rotation angle and the second rotation angle, an Euler angle based algorithm is used.

7. A non-transitory computer readable medium containing program instructions executed by a controller, the computer readable medium comprising:
  program instructions that detect a reference gaze, a first reference vector, and a second reference vector by performing a gaze calibration, wherein the second reference vector is a fixed vector that directs to ground;
  program instructions that detect substantially central points of a pupil and an eyeball from an image that includes user eyes, wherein the controller detects three central points among central points of the pupil and the eyeball for a left eye and a right eye;
  program instructions that generate a normal vector that corresponds to a plane formed by the three central points and a gaze vector using central points of the pupil and the eyeball of the left eye or the right eye among the three central points;
  program instructions that calculate a first rotation angle and a second rotation angle by comparing the gaze vector and the normal vector, respectively, with the first reference vector and the second reference vector;
  program instructions that calculate a mean value of the first rotation angle and the second rotation angle; and
  program instructions that detect a gaze by rotating the reference gaze as much as the mean value.

8. The non-transitory computer readable medium of claim 7, wherein in the detection of the first reference vector, the first reference vectors for left and right eyes are detected, and
  in the calculation of the first rotation angle, the first rotation angle is calculated by comparing the gaze vector for the left eye or the right eye of the user with the first reference vector of any one of the left and right eyes.

9. The non-transitory computer readable medium of claim 7, wherein in the calculation of the first rotation angle and the second rotation angle, an Euler angle based algorithm is used.

* * * * *